Patented Feb. 20, 1934

1,947,926

UNITED STATES PATENT OFFICE 1,947,926

SEED GRAIN DRESSINGS AND PROCESS OF PREPARING THEM

Adolf Steindorff, Kaspar Pfaff, and Michael Erlenbach, Frankfort-on-the-Main, Germany, assignors to Winthrop Chemical Company, Inc., New York, N. Y., a corporation of New York No Drawing. Application August 2, 1930, Serial No. 472,754, and in Germany September 26, 1929

3 Claims. (Cl. 167—38)

The present invention relates to seed grain dressings, more particularly to seed grain dressings of the following formula:

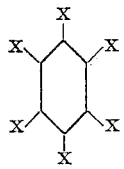

wherein X stands for a substituent of the class comprising halogen, hydrogen, nitro, alkyl, halogenated alkyl and amino, at least three X's being halogen atoms, and process of preparing them.

We have found that highly halogenated benzenes, homologues or substitution products thereof and such benzenes, homologues and substitution products thereof, as contain in the molecule at least 3 halogen atoms and at least one further substituent of the group consisting of halogen, amino, nitro and halogenated alkyl, are very well suited for dressing seed grains.

The following mixtures have, for instance, proved to be well suited.

1. A mixture of 20% of hexa-chlorobenzene or tetrabromobenzene or hepta-chlorotoluene and 80% of talc may be used as dry dressing agent against the different diseases of seed grains by utilizing 150 grams of this mixture per 1 centner of seeds.

2. A mixture consisting of 20 parts of pentachloraniline and 80 parts of talc can be used as dry dressing agent, by utilizing 100–150 grams of this mixture per 1 centner of grain.

3. A mixture of 15 parts of 1.2.4.6-tetrachloro-3.5-dinitrobenzene and 85 parts of talc can be used as dry dressing agent, by utilizing 100–150 grams of this mixture for dressing 1 centner of wheat- or oats-seeds.

4. A mixture containing 30% of trichlorodinitrobenzene and 70% of talc can be used as a very effective dry dressing agent against the smut of wheat (*Tilletia tritici*) and against the *Fusarium nivale of rye*. 150 grams of the mixture are used per 1 centner of seeds.

The said agents may also be used mixed with other fungicides, especially with those containing a metal-compound; if required, the products can be mixed with substances, having the action of an adhesive agent or wetting agent. The seeds can be dressed according to the various known methods.

We claim:

1. A seed grain dressing composition comprising as an active ingredient a compound of the formula

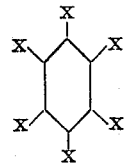

wherein X stands for a substituent of the group consisting of halogen, hydrogen, nitro, alkyl, amino and halogenated alkyl, at least 3 X's being halogen and at least one other X being a substituent of the group consisting of halogen, amino, nitro and halogenated alkyl.

2. A seed grain dressing composition comprising as an active ingredient tetra-halogenobenzene.

3. Seed grain dressings which contain 1,2,4,6-tetrachloro-3,5-dinitrobenzene.

ADOLF STEINDORFF.
KASPAR PFAFF.
MICHAEL ERLENBACH.